(No Model.) 2 Sheets—Sheet 2.

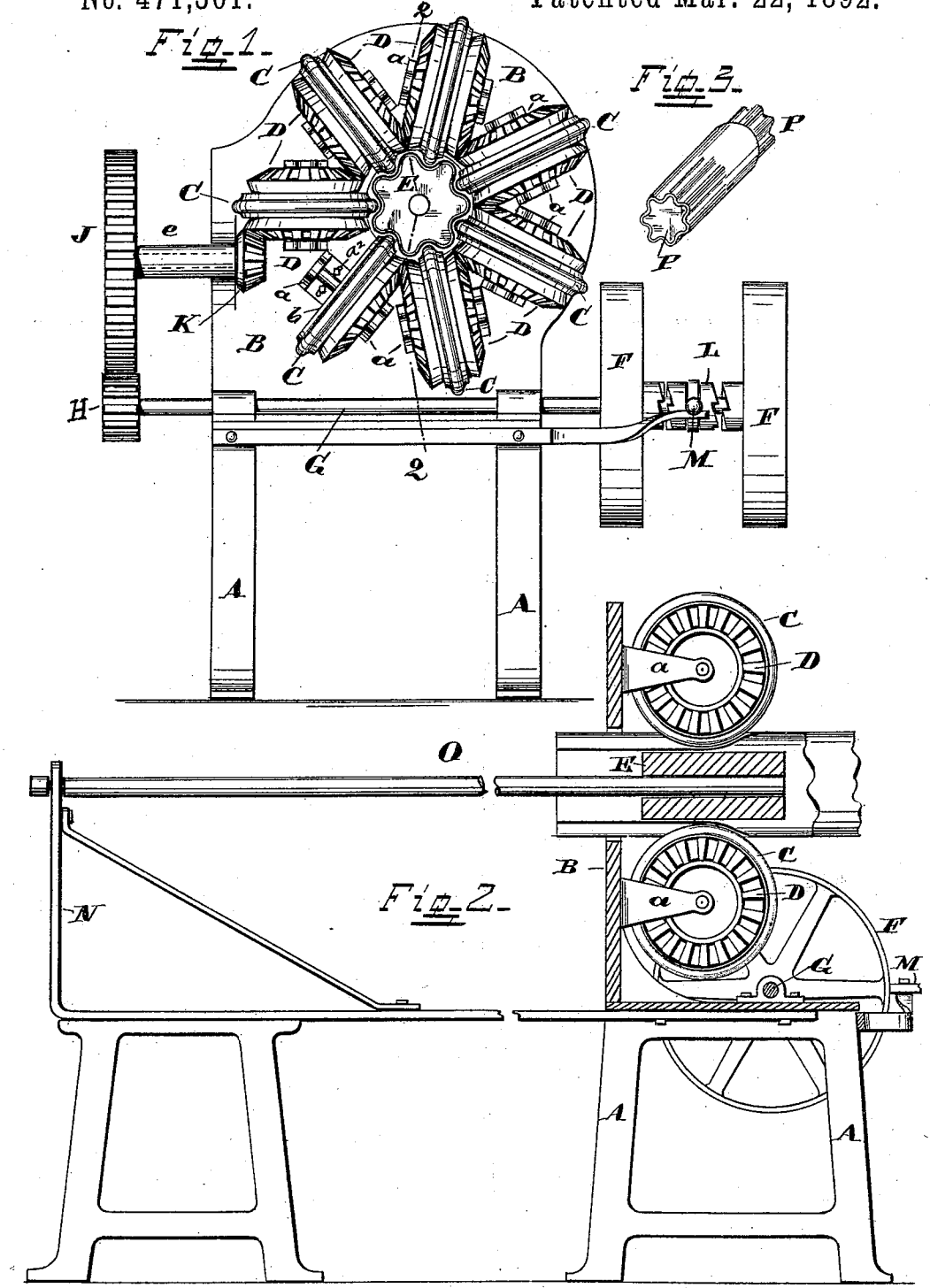

G. C. KEENE.
MACHINE FOR CORRUGATING PIPES.

No. 471,301. Patented Mar. 22, 1892.

Witnesses:
W. B. Brice.
Harry F. Kohing.

Inventor:
George C. Keene
per O. M. Hill Atty.

UNITED STATES PATENT OFFICE.

GEORGE C. KEENE, OF CINCINNATI, OHIO.

MACHINE FOR CORRUGATING PIPES.

SPECIFICATION forming part of Letters Patent No. 471,301, dated March 22, 1892.

Application filed July 10, 1891. Serial No. 399,047. (No model.)

*To all whom it may concern:*

Be it known that I, GEORGE C. KEENE, a citizen of the United States, residing at Cincinnati, in the county of Hamilton, State of Ohio, have invented certain new and useful Improvements in Machines for Corrugating Pipes, of which the following is a specification, reference being had to the accompanying drawings.

My invention has for its object the corrugating of sheet-metal pipes.

Figure 4:
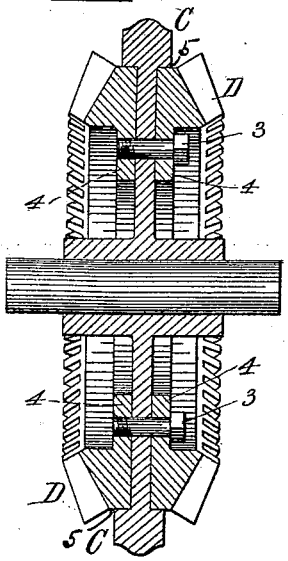
Figure 5:
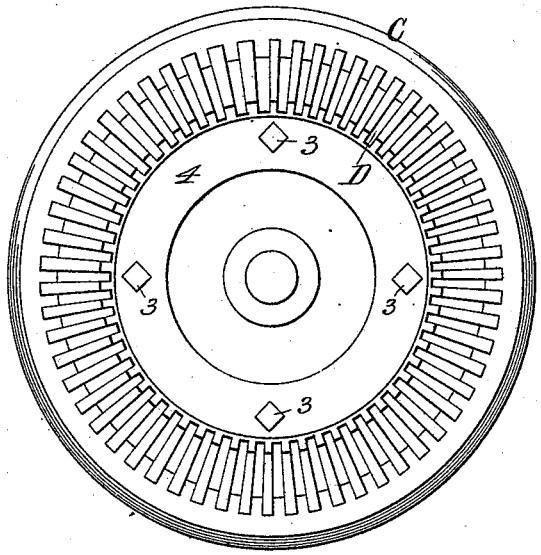

In the accompanying drawings, Figure 1 is a front elevation of a machine embodying my invention. Fig. 2 is a side elevation of the rear portion of my improved machine and a sectional view taken on the dotted line 2 2 of Fig. 1, showing the relative position of the mandrel and corrugating-wheels with a section of pipe in position. Fig. 3 is a perspective view of a portion of a detachable corrugated mandrel with a portion of a pipe-section in position thereon partially corrugated, said detachable mandrel when employed taking the place of the stationary mandrel shown in Figs. 1 and 2. Fig. 4 is a central vertical section through one of the corrugating-wheels and gears, showing one mode of connecting said gears to said wheel; and Fig. 5 is a side or face view of the construction shown in Fig. 4.

My improved machine for corrugating sheet-metal pipe is preferably constructed as follows: The operating mechanism is supported by a suitable frame A, to which is suitably connected the upright piece B. The corrugating-wheels C are journaled in suitable bracket-bearings $a$, connected to upright B. These corrugating-wheels may be of any desired number (seven being preferred) and are arranged to form a circle—that is, they all radiate from a common center, the circular space at the center between said corrugating-wheels corresponding with the size of pipes to be corrugated. Each of the corrugating-wheels C (excepting the last one in the circle) is provided with the detachable beveled gears D, the gear at one side of one corrugating-wheel meshing with the beveled gear on the adjacent gear, and so on around the entire circle, excepting that the gear on one face of the last wheel is left off, as shown at $b$, Fig. 1.

The beveled gears D may be detachably connected to the corrugating-wheels in any desired operative manner, the object of having said gears detachably connected being to accommodate varying sizes of pipe by substituting larger or smaller gears, as required. The means herein shown for detachably connecting said gears to the corrugating-wheels consists of screw-threaded bolts 3, passed through the flange 4 of the gear at one side the wheel, through the body of the latter, said bolt being tapped into the flange 4 of the gear at the opposite side of the wheel. The outer periphery of each gear on its inner face preferably rests directly beneath the shoulders 5, formed by the enlarged peripheral surface of the corrugating-wheel, as more clearly shown in Fig. 4. The brackets $a$ are also adjustably connected to the upright B by means of elongated openings $a^2$ in said brackets, through which the retaining-bolts pass. This means of adjustment is old and well known and enables the corrugating-wheels to be correctly adjusted with reference to each other and also with reference to the corrugated mandrel E.

The machine is operated through the medium of band-wheels F on shaft G, the opposite end of said shaft having the pinion H, which meshes with gear J, the latter being connected to pinion K by means of a shaft passing through sleeve $e$.

The machine is started and stopped by means of a suitable clutch L, connected to shaft G in the usual manner and operated by a lever M.

When designed to operate as shown in Figs. 1 and 2, the mandrel E engages between the corrugating-wheels C, said mandrel being provided with a rearwardly-projecting rod O, the free end of which rests in a recess in the top of the upright support N, as shown.

The operation of corrugating the pipe is as follows: The pipe is first bent to a tubular form, with its meeting edges joined and locked in the usual manner, after which one end of the pipe is placed over the mandrel E. The operator now forces the pipe between the corrugating-wheels C, which latter, in connection with the concave corrugations in the mandrel, cause the pipe to be corrugated longitudinally as it is fed rearward on rod O, after which it is removed from said rod ready for use.

If desired, a detachable mandrel P may be employed instead of the stationary mandrel E, and when the detachable mandrel is employed the pipe is placed thereon, after which the pipe and mandrel are fed between the corrugating-wheels, producing the same effect as in the operation aforedescribed. It will thus be seen that the pipe may be fed between the corrugating-wheels over a stationary mandrel, or the mandrel and pipe may be fed together between said wheels, the only difference being that in the latter case a mandrel of equal length with the pipe must be employed, while the stationary mandrel need not be of such length.

The advantages of my improved machine for corrugating sheet-metal pipes are apparent. The facility for corrugating pipes of from eight to ten feet in length, or longer, if desired, is a very great advantage, as less joints are produced, and consequently less expense is incurred.

Any suitable operative driving mechanism other than that herein set forth may be employed for transmitting motion to the gears D.

What I claim as new, and desire to secure by Letters Patent, is—

1. In a machine for corrugating sheet-metal pipes, the geared corrugating-wheels C, arranged to form a circle and radiating from a central space, the gear at one side of one corrugating-wheel meshing with the gear on the adjacent wheel, in combination with a corrugated mandrel adapted to enter or engage within the central space between said corrugating-wheels, and suitable means for rotating the latter, for the purposes set forth.

2. In a machine for corrugating sheet-metal pipes, the corrugating-wheels radiating from a common center, said wheels having an enlarged peripheral surface with detachable gears D connected thereto beneath the shoulders 5, formed by reason of said enlarged surface, the gear on one wheel meshing with the gear on the adjacent wheel, in combination with a corrugated mandrel and suitable means for operating said gear-wheels, substantially as set forth.

3. In a machine for corrugating pipes, the combination of corrugating-wheels C, arranged radially to a common center, gears D, detachably connected to said wheels and adapted to mesh, as set forth, and a corrugated mandrel, said wheels engaging with the concave surfaces of said mandrel, and suitable means for operating said gears, for the purposes specified.

GEORGE C. KEENE.

Witnesses:
O. M. HILL,
W. B. BRICE.